(12) United States Patent
Louis et al.

(10) Patent No.: US 7,520,813 B2
(45) Date of Patent: Apr. 21, 2009

(54) TORQUE LIMITER HAVING TWO MECHANICAL INLETS

(75) Inventors: Charles Louis, Aix-en-Provence (FR); Patrick Quesne, Ecouflant (FR)

(73) Assignees: Eurocopter, Marignane Cedex (FR); Artus, Avrille (FR)

( * ) Notice: Subject to any disclaimer, the term of this patent is extended or adjusted under 35 U.S.C. 154(b) by 245 days.

(21) Appl. No.: 11/384,413

(22) Filed: Mar. 21, 2006

(65) Prior Publication Data

US 2006/0211500 A1 Sep. 21, 2006

(30) Foreign Application Priority Data

Mar. 21, 2005 (FR) ................................... 05 02762

(51) Int. Cl.
*F16D 7/08* (2006.01)
(52) U.S. Cl. .......................................... 464/36; 74/625
(58) Field of Classification Search .................. 464/35, 464/36; 192/56.62, 150; 74/411, 625; 477/178; 416/142
See application file for complete search history.

(56) References Cited

U.S. PATENT DOCUMENTS

| | | | | |
|---|---|---|---|---|
| 811,317 A | * | 1/1906 | Newton | 74/625 X |
| 999,088 A | * | 7/1911 | Beede et al. | 74/625 X |
| 4,557,154 A | * | 12/1985 | Iwata et al. | 464/36 X |
| 4,613,023 A | | 9/1986 | Fairbairn et al. | |
| 4,901,831 A | | 2/1990 | Ito et al. | |
| 4,909,363 A | | 3/1990 | Trommer | |
| 2006/0288807 A1 | * | 12/2006 | Liu | |

FOREIGN PATENT DOCUMENTS

| | | |
|---|---|---|
| EP | 0 997 661 | 5/2000 |
| EP | 1 072 507 | 1/2001 |

\* cited by examiner

*Primary Examiner*—Greg Binda
(74) *Attorney, Agent, or Firm*—Young & Thompson

(57) ABSTRACT

A torque limiter is provided with a first plate that rotates a second plate via a plurality of balls. The second plate shares the same axis as the first plate. Each ball is suitable for escaping from a respective housing in order to cease driving the second plate when the torque exceeds a predetermined threshold. Each housing includes a first orifice and a second orifice facing each other and formed respectively in the first plate and in the second plate. The torque limiter is remarkable in that it includes first and second distinct inlets for causing the first plate to turn about its axis.

14 Claims, 2 Drawing Sheets

TORQUE LIMITER HAVING TWO MECHANICAL INLETS

The present invention relates to a device having two mechanical inlets for limiting the torque exerted on a power transmission system so as to allow it to be operated both manually and automatically.

The device is particularly well adapted to a system for automatically folding a blade of a main rotor for providing a helicopter with lift and forward drive, with a system of this type being particularly useful when the helicopter needs to be parked on board a ship.

BACKGROUND OF THE INVENTION

In order to fold a blade automatically, i.e. to cause it to pass from a flight configuration to a parking configuration, a motor drives a power transmission system for driving means for folding the blade. However, if some external element, e.g. an obstacle associated with the environment such as a wall or a gust of wind, should stop the blade moving while it is being folded, the torque exerted on the transmission system will increase, thereby running the risk of severely damaging the system. It is therefore essential to provide a device for limiting this torque.

A torque limiter is known that comprises a first plate that drives a second plate via a plurality of balls, the balls being housed in orifices formed in the first and second plates. The torque limiter is disposed between an actuator and a transmission system.

If the torque exerted on the transmission system becomes too great, then the balls escape from the orifices, thereby preventing the second plate being driven by the first plate. As soon as the torque returns to an acceptable level, the balls return into their housings, and the first plate can again drive the second plate.

That torque limiter satisfies requirements. However another major difficulty needs to be taken into consideration. In the event of the motor of the automatic blade-folding device breaking down, it can become impossible to fold the blade, which can lead to major problems of shortage of space on board the ship where the helicopter is parked. Since the torque limiter cannot be used as an actuator, it is necessary to provide auxiliary means for driving the transmission system. The folding device then becomes particularly complex, given the possibility of the motor jamming, which can impede maneuvering, and given the geometrical constraints imposed by the main rotor.

OBJECTS AND SUMMARY OF THE INVENTION

Under such conditions, an object of the present invention is to provide a torque limiter that, when necessary, can be used as drive means, thus making both manual operation and automatic operation possible.

According to the invention, a torque limiter of a power transmission system that allows both manual operation and automatic operation, is provided with a first plate that drives in rotation via a plurality of balls a second plate which has the same axis as the first plate, each ball being suitable for escaping from a respective housing in order to prevent the second plate being driven when the torque exerted on the power transmission system exceeds a predetermined threshold. Each housing comprises a first orifice and a second orifice facing each other and formed respectively in the first plate and in the second plate. The torque limiter is remarkable in that it includes first and second distinct inlets suitable for causing said first plate to be turned about its axis.

As explained below, the second plate drives a power transmission system via teeth and a central shaft, which transmission system is preferably used for activating a mechanical system such as a system for folding a blade of a rotorcraft main rotor for providing lift and forward drive.

So long as the torque exerted on the power transmission system is below a predefined threshold, the balls remain in their housings and enable the first plate to drive the second plate.

In contrast, if the blade is blocked by an obstacle, the torque exerted on the power transmission system increases. When the predefined threshold is exceeded, the balls escape from their housings and push the second plate which moves axially away from the first plate. Consequently the first plate can no longer drive the second plate, thus producing a torque-limiting effect.

In addition, the torque limiter includes a reversible freewheel comprising said first plate in an inner zone and a toothed ring in an outer zone, the toothed ring constituting the first inlet.

Furthermore, the first plate possessing at least two radial branches that are uniformly distributed around its periphery, the reversible freewheel comprises a number of pairs of self-blocking rollers that is identical to the number of branches, the self-blocking rollers in any one pair being disposed on either side of a corresponding branch. Each branch is then provided with a main spring that urges the self-blocking rollers of a pair in opposite directions.

Under such conditions, two adjacent branches are interconnected by a face that has a bend in its center of the first plate, with the radial distance between the core of the first plate and the toothed ring then being at a minimum at the bend of said face, and less than the diameter of the self-blocking rollers. Under urging from the main springs, the rollers slide on the slopes of each of the bent faces, and given the above-specified radial distance, end up being blocked between the first plate and the toothed ring.

In automatic operation, the first inlet, i.e. the toothed ring, is driven by a motor that is independent of the torque limiter. Via the self-blocking rollers, the toothed ring in turn drives the first plate which drives the transmission system via the balls, the second plate, and the central shaft.

Since operation is automatic, if the torque exerted on the transmission system exceeds a predetermined threshold, it is essential for the torque limiter of the invention to be capable of stopping the motor.

Consequently, the torque limiter is provided with stop means provided with a lever constrained to move in translation with the second plate so as to stop the motor when the torque is greater than the predetermined threshold.

In this configuration, under the action of the balls, the second plate moves in translation away from the first plate and raises the lever which activates the stop means, e.g. a switch. The switch then causes the motor to stop by interrupting its electrical power supply, for example, so as to prevent the harmful torque being exerted.

The torque limiter thus restrains the torque exerted on the power transmission system, keeping it down to a value that does not exceed the predefined threshold.

In the event of motor malfunction, the torque limiter advantageously allows a manual mode of operation via its second inlet. In this mode of operation, the invention acts not only as a torque limiter, but also as a mechanical actuator.

Preferably, the second inlet comprises a bell having a first end formed with a hex socket, so with six sides, and a second end carrying as many fingers as there are pairs of self-blocking rollers. Each finger is arranged between the first plate and the toothed ring in such a manner as to occupy a position between two adjacent self-blocking rollers of two distinct pairs of self-blocking.

In manual operation, the operator turns the bell by means of a hex key inserted in the first end of the bell. The fingers then unblock the self-blocking rollers and turn the first plate without driving the toothed ring. This enables the transmission system to be driven manually even if the toothed ring is jammed in position, e.g. by a faulty motor.

Furthermore, the torque limiting function is conserved. If the torque exceeds the predetermined threshold, then the balls escape from their housings thus producing a characteristic clicking sound that the operator can hear.

Finally, the presence of pairs of self-blocking rollers, instead of a single wheel, is most advantageous insofar as it allows the torque limiter, and more particularly the first and second inlets, to operate in either direction of rotation, whether clockwise and anticlockwise.

BRIEF DESCRIPTION OF THE DRAWING

The invention and its advantages appear in greater detail in the context of the following description which shows a preferred embodiment that is given without any limiting character and that is described with reference to the accompanying drawing, in which.

MORE DETAILED DESCRIPTION

Elements shown in more than one figure are given the same reference in each figure.

Figure 1:
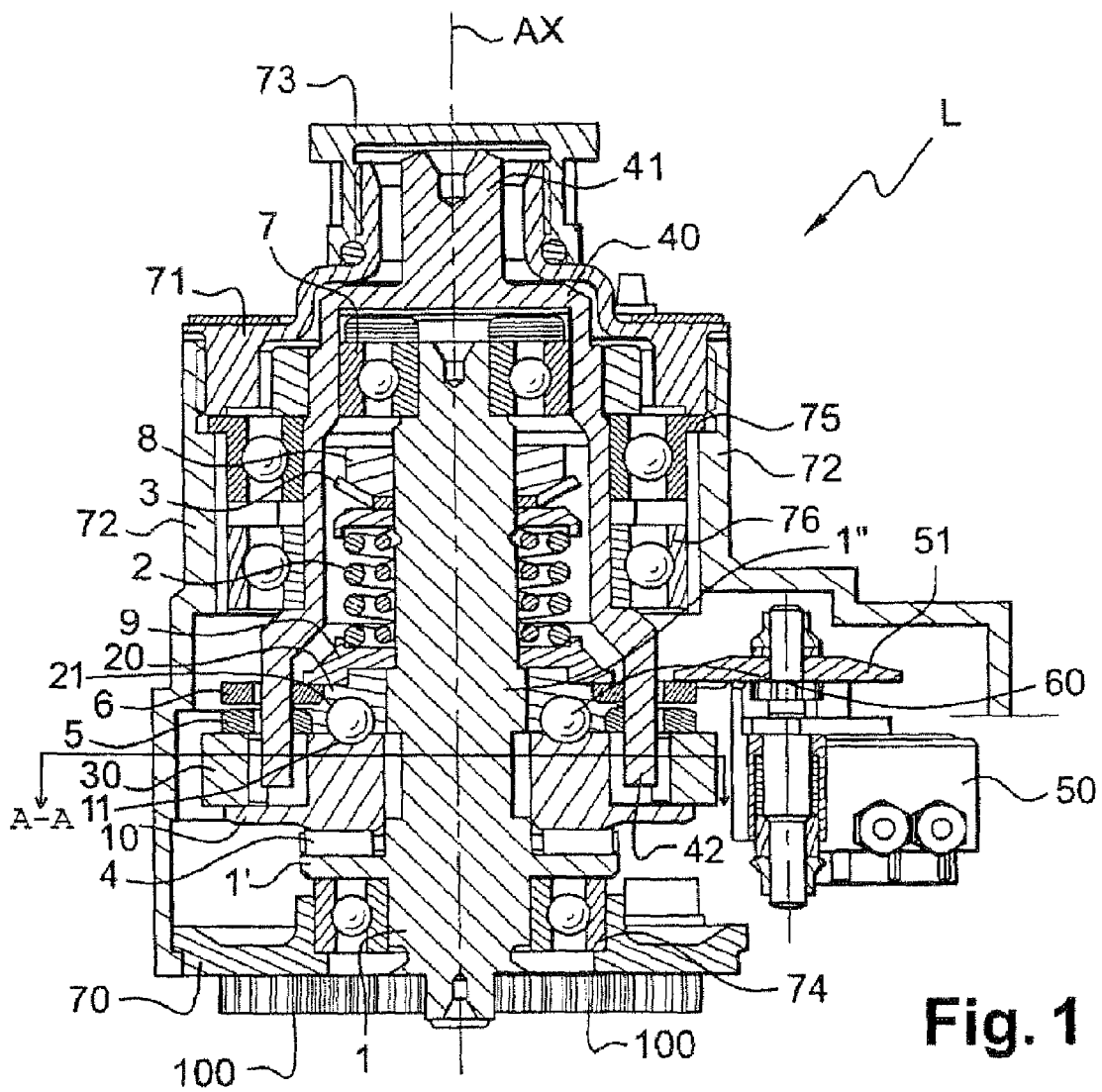
FIG. 1 is a section of the torque limiter of the invention.

FIG. 1 is a section of a torque limiter L of the invention.

It comprises a bell 40 having a central shaft 1 inserted therein. In addition, a ball bearing 7, a nut 8, a washer 3 for braking the nut 8, a main spring 2, and a spacer 9 are disposed in succession between the bell 40 and the top portion of the central shaft 1 and are held axially between the first end 41 of the bell 40 and teeth 1" on the central shaft 1.

By means of these teeth 1", the central shaft 1 can be rotated about its axis AX by a second plate 20. In turn, the second plate 20 is driven by a first plate 10 via a plurality of balls 60, each ball 60 being received in a housing constituted by first and second mutually-facing orifices 11, 21 formed respectively in the first and second plates 10 and 20. The first and second plates 10 and 20 possess the same axis of rotation AX and they are arranged radially between the intermediate portion of the central shaft 1 and the second end of the bell 40.

In addition, a spacer 5 is located in part between the first and second plates 10 and 20. The spacer 5 is secured to the first plate 10 by conventional means, e.g. rivets. In addition, the second end of the bell 40 has four fingers 42 whose tips occupy the four corners of a square, and the spacer 5 has four orifices with oblong holes through which the fingers 42 pass, for example.

Similarly, a pusher 6 has four orifices through which the fingers 42 pass. The pusher 6 is moved in translation along the axis AX by the second plate 20 when it moves in the direction going away from the first plate 10. As explained below, the purpose of the pusher 6 is to push a lever 51 in order to activate a switch 50.

Advantageously, the torque limiter L includes a reversible freewheel comprising in its inner zone the first plate 10 and in its outer zone a toothed ring 30 which is arranged between the peripheries of the first plate 10 and of the spacer 5.

Furthermore, the bottom portion of the central shaft 1 includes a shoulder 1' that is spaced apart from the first plate 10 by an adjustment spacer 4. Unlike the second plate 20, the first plate 10 can under no circumstances be moved in translation along the axis AX.

Finally, the torque limiter L includes a casing that surrounds all of the above-described parts. It is provided in particular with an end wall 70, a cover 71, and side walls 72 presenting an opening through which there projects at least a portion of the toothed ring 30. In addition, a plug 73 is removably secured on the cover 71 and covers the first end 41 of the bell 40.

A plurality of ball bearings 74, 75, and 76 also serve to ensure that the movements of the rotary elements of the device, e.g. the central shaft 1 and the bell 40, are not impeded.

Figure 2:
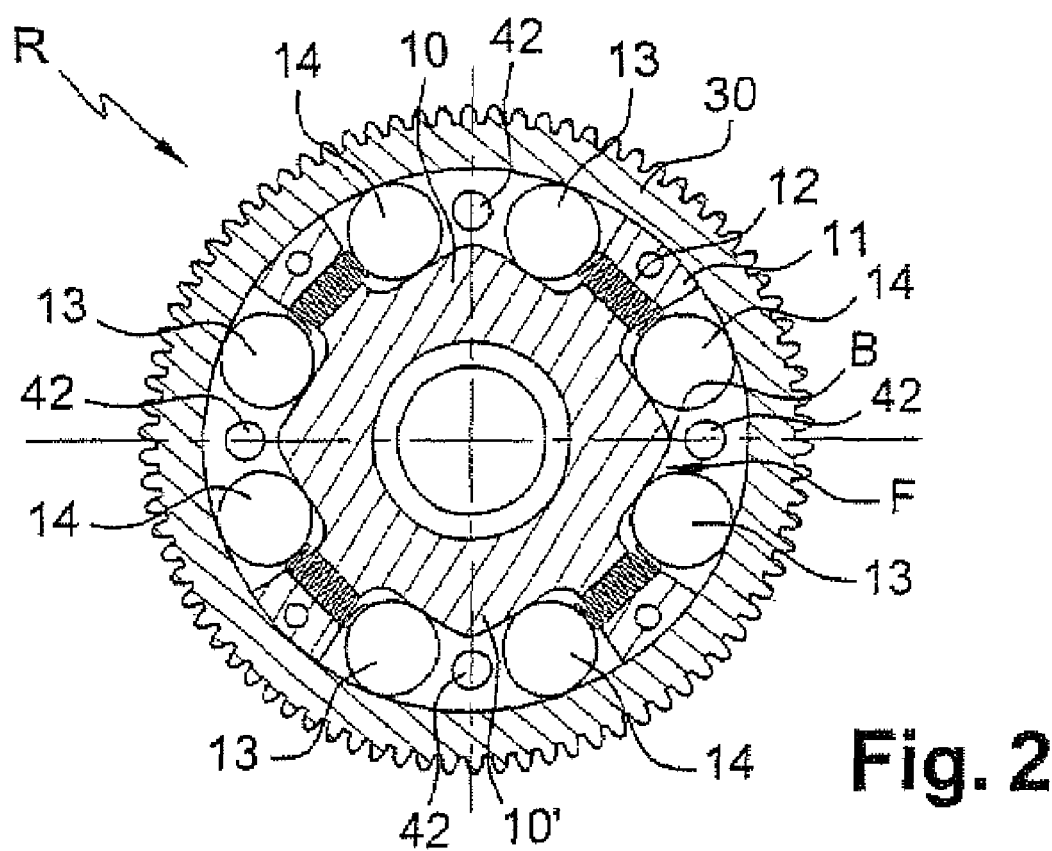
FIG. 2 is a plan view of the reversible freewheel taken along line A-A of FIG. 1.

FIG. 2 is a plan view of the reversible freewheel R of the torque limiter L.

The first plate 10 has four branches 11 uniformly distributed around its periphery, each branch 11 being provided with a secondary spring 12. Furthermore, pairs of adjacent branches are interconnected by a respective face F of the first plate 10, said face F being bent in its center so that the radial distance between the core 10' of the first plate 10 and the toothed ring 30 is minimal at the level of the bend B.

In addition, the freewheel R is provided with four pairs of self-blocking rollers. The rollers 13, 14 in any one pair are arranged on either side of a corresponding branch 11, and they are urged in opposite directions by the secondary spring 12 of the branch 11. By being pushed in this way, the self-blocking rollers are wedged between the first plate 10 and the toothed ring 30.

Finally, FIG. 2 shows the four fingers 42 at the second end of the bell 40 which are disposed between the first plate 10 and the toothed ring 30. More precisely, each finger 42 is arranged between two adjacent self-blocking rollers 13 and 14 of two distinct and adjacent pairs of self-blocking rollers.

With reference to FIGS. 1 and 2, the torque limiter L controls a main power transmission line, e.g. for folding a blade of a main rotor for providing a rotorcraft with forward drive and lift. The central shaft 1 thus represents a mechanical outlet from the torque limiter L and drives an epicyclic gear train 100 of the transmission system (or any analogous means) to rotate about its axis AX.

To set the central shaft 1 itself in motion, the torque limiter L has first and second mechanical inlets suitable respectively for enabling operation to be automatic or manual. The first inlet is represented by the toothed ring 30, while the first end 41 of the bell 40 constitutes the second inlet, e.g. in the form of a hex socket.

Regardless of which inlet is used, the first plate 10 serves to cause the second plate 20 to rotate via a plurality of balls 60. The second plate 20 then drives the sole mechanical outlet of the torque limiter L, i.e. the central shaft 1, via the teeth 1" disposed on the periphery of said central shaft 1.

In automatic operation, a motor (not shown in the figures) is in contact either directly or via a secondary power transmission system with a portion of the toothed ring 30 that projects from the side walls 72 of the casing. It then imparts rotary movement to said toothed ring 30.

Since the self-blocking rollers are blocked between the toothed ring 30 and the first plate 10, regardless of the direction of rotation of the toothed ring 30, the rotary movement thereof is transferred to the first plate 10. Consequently, the first plate 10 drives the epicyclic gear train or the main transmission system successively via the balls 60, the second plate 20, and then the central shaft 1.

If the torque exerted by the main and/or secondary transmission system exceeds a predetermined threshold, corresponding to the stiffness setting of the main spring 2 as determined in particular with the help of the nut 8, the balls 60 leave their housings. Since the first plate cannot move along the axis AX under drive from the balls 60, it is the second plate 20 that then begins to move in translation along said axis AX away from the first plate 10. Consequently, the pusher 6 also moves along the axis AX and pushes the lever 51 that activates the switch 50.

The switch 50 then orders the motor to stop, by cutting off its electrical power supply. The torque exerted on the transmission system is then removed.

If the increase in torque in the main and/or secondary transmission system is caused by an obstacle associated with the environment, it suffices to eliminate the obstacle and restart the motor in order to continue the operation.

However, if the increase in torque is due to a malfunction of the motor or if the motor breaks down, it is imperative to have some other drive means available.

The torque limiter L of the invention then makes manual operation possible, without requiring the use of auxiliary actuator means.

Thus, an operator can turn the bell 40 via its first end 41 using the hex socket and a conventional tool. Regardless of the direction of rotation, whether clockwise or anticlockwise, each finger 42 pushes against one of the self-blocking rollers of a pair so that said roller is no longer blocked between the toothed ring 30 and the first plate 10. The associated secondary spring 12 retracts, and each finger 42 ends up by driving one of the branches of the first plate 10. As a result, under drive from the operator, the bell 40 turns the first plate 10 but not the toothed ring 30.

If the torque exerted is too great, the balls 60 leave their housings. The consequence of the balls moving in this way is to generate a clicking sound that is easily heard by the operator who then ceases applying any drive.

Naturally, the present invention can be subjected to numerous variations in the way it is implemented. Although one embodiment is described above, it will readily be understood that it is not possible to identify exhaustively all conceivable embodiments. It is naturally possible to envisage replacing any of the means described by equivalent means without thereby going beyond the ambit of the present invention.

Furthermore, in the embodiment described and shown in the figures, the first plate 10 has four branches 11. Consequently the torque limiter L is provided with four each of the following:

pairs of rollers 13, 14;
fingers 42;
orifices In the pusher 6; and
orifices in the spacer 5.

Nevertheless, this number could clearly be varied, depending on requirements, so long as it remains greater than or equal to 2.

What is claimed is:

1. A torque limiter (L) of a power transmission system, comprising:
   a first plate (10) that drives in rotation a second plate (20) via a plurality of balls (60),
   said second plate (20) sharing the same axis as said first plate (10),
   each ball (60) being suitable for escaping from a respective housing so as to cease transmitting drive to said second plate (20) when the torque exerted on said power transmission system exceeds a predetermined threshold,
   each said housing comprising a first orifice and a second orifice facing each other and made respectively in the first plate and in the second plate,
   the torque limiter having first and second distinct inlets for enabling said first plate (10) to be turned.

2. A torque limiter according to claim 1, including a reversible freewheel (R) comprising said first plate (10) in an inner zone and a toothed ring (30) in an outer zone, said toothed ring (30) constituting said first inlet.

3. A torque limiter according to claim 2, wherein said first plate (10) has at least two radial branches (11) uniformly distributed around its periphery,
   said reversible freewheel (R) has a number of pairs of self-blocking rollers (13, 14) that is identical to the number of branches (11),
   said self-blocking rollers (13, 14) of each pair being disposed on either side of a corresponding branch (11).

4. A torque limiter according to claim 3, wherein two adjacent branches of said first plate are interconnected by a face (F) with a bend in a center of said face, the radial distance between the core (10') of said first plate (10) and said toothed ring (30) then being at a minimum at the bend (B) of said face (F).

5. A torque limiter according to claim 3, wherein each branch (11) is provided with a secondary spring (12) that urges the self-blocking rollers (13, 14) of a pair in opposite directions.

6. A torque limiter according to claim 3, wherein, in automatic operation, said first plate (10) is driven by said toothed ring (30) via said self-blocking rollers (13, 14), said toothed ring (30) being controlled by a motor that is independent of said torque limiter (L).

7. A torque limiter according to claim 6, including stop means provided with a lever (51) for stopping said motor when said torque is greater than said threshold.

8. A torque limiter according to claim 7, wherein, said second plate (20) performing a movement in translation away from said first plate (10) under drive from said balls (60) when said threshold is exceeded, said lever (51) is moved by said second plate (20) so as to activate said stop means.

9. A torque limiter according to claim 7, wherein said stop means is a switch (50).

10. A torque limiter according to claim 1, the torque limiter having a single outlet (1).

11. A torque limiter of a power transmission system, comprising:
   a first plate that drives in rotation a second plate via a plurality of balls,
   said second plate sharing a same axis as said first plate,
   each ball being suitable for escaping from a respective housing so as to cease transmitting drive to said second plate when the torque exerted on said power transmission system exceeds a predetermined threshold,
   each said housing comprising a first orifice and a second orifice facing each other and made respectively in the first plate and in the second plate,
   the torque limiter having first and second distinct inlets for enabling said first plate to be turned and including a reversible freewheel (R) comprising said first plate in an inner zone and a toothed ring in an outer zone, said toothed ring constituting said first inlet,
   wherein said first plate has at least two radial branches uniformly distributed around a periphery thereof, said reversible freewheel (R) has a number of pairs of self-blocking rollers that is identical to the number of branches, said self-blocking rollers of each pair being disposed on either side of a corresponding branch, wherein said second inlet comprises a bell with a first end, and a second end that has as many fingers as there are pairs of self-blocking rollers.

12. A torque limiter according to claim 11, wherein each finger (42) of said bell (40) is disposed between said first plate (10) and said toothed ring (30) in such a manner as to be positioned between two adjacent self-blocking rollers of two distinct pairs of self-blocking rollers.

13. A torque limiter according to claim 11, wherein, in manual operation, each finger (42) unblocks said self-blocking rollers (13, 14) to drive said first plate (10) without driving said toothed ring (30).

14. A torque limiter of a power transmission system, said torque limiter comprising:

a first housing having a first plate;

a second housing having a second plate;

a plurality of balls, said first plate driving said second plate in rotation via said plurality of balls, said second plate sharing a same rotational axis as said first plate, each of said plurality of balls being structured and arranged for escaping from a respective one of said first and second housings so as to cease transmitting drive to said second plate when a torque exerted on said power transmission system exceeds a predetermined threshold, said first housing comprising a first orifice and said second housing comprising a second orifice facing each other and respectively in the first plate and in the second plate, the torque limiter having first and second distinct mechanical inlets enabling said first plate to be turned and rotate a single mechanical outlet.

* * * * *